(12) United States Patent
Gieras

(10) Patent No.: US 10,516,307 B2
(45) Date of Patent: Dec. 24, 2019

(54) INTERIOR PERMANENT MAGNET MOTOR/ROTOR WITH CURVED AND SPOKE-TYPE PERMANENT MAGNETS

(71) Applicant: Hamilton Sundstrand Corporation, Charlotte, NC (US)

(72) Inventor: Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/251,149

(22) Filed: Aug. 30, 2016

(65) Prior Publication Data
US 2018/0062461 A1    Mar. 1, 2018

(51) Int. Cl.
| | | |
|---|---|---|
| H02K 1/27 | (2006.01) | |
| H02K 15/03 | (2006.01) | |
| H02K 21/14 | (2006.01) | |

(52) U.S. Cl.
CPC ......... *H02K 1/2706* (2013.01); *H02K 1/2766* (2013.01); *H02K 15/03* (2013.01); *H02K 21/14* (2013.01); *H02K 1/27* (2013.01); *H02K 2213/03* (2013.01)

(58) Field of Classification Search
CPC ...... H02K 21/14; H02K 1/2706; H02K 15/14; H02K 2213/03; H02K 15/03; H02K 1/2766
USPC ................................ 310/115, 156.01–156.84
See application file for complete search history.

(56) References Cited

U.S. PATENT DOCUMENTS

| | | | | |
|---|---|---|---|---|
| 4,405,873 A | * | 9/1983 | Nondahl | ............... H02K 1/2773 310/156.56 |
| 5,962,944 A | * | 10/1999 | Narita | ..................... H02K 1/276 310/112 |
| 6,025,667 A | * | 2/2000 | Narita | .................. H02K 1/2766 310/156.53 |

(Continued)

FOREIGN PATENT DOCUMENTS

| | | |
|---|---|---|
| CN | 205105071 U | 3/2016 |
| DE | 102014117025 A1 | 10/2015 |
| JP | 2008253124 | * 10/2008 |

OTHER PUBLICATIONS

JP_2008253124_A_I English Translation.*

(Continued)

*Primary Examiner* — Mang Tin Bik Lian
*Assistant Examiner* — Maged M Almawri
(74) *Attorney, Agent, or Firm* — Cantor Colburn LLP

(57) ABSTRACT

An interior permanent magnet (IPM) rotor as a well as method for providing and a system that includes an IPM rotor is provided. The IPM rotor includes a rotor body that rotates around a central rotational axis, wherein the rotor body is a ferromagnetic core with a central axial bore and is included of a plurality of rotor segments, wherein each rotor segment corresponds to a pole of the IPM motor, and wherein at least one of the rotor segments of the plurality of rotor segments includes a spoke-type interior permanent magnet (IPM) disposed within the rotor body and extending radially outward from the central axial bore to an outer surface of the rotor body, and a curved interior permanent magnet (IPM) disposed within the rotor body and extending radially outward at an incline with respect to a radial plane extending through a center of the spoke-type IPM.

16 Claims, 8 Drawing Sheets

(56) References Cited

U.S. PATENT DOCUMENTS

| | | | | |
|---|---|---|---|---|
| 6,147,428 | A * | 11/2000 | Takezawa | H02K 1/2766 310/156.57 |
| 6,177,745 | B1 * | 1/2001 | Narita | H02K 1/2766 310/156.43 |
| 6,218,753 | B1 | 4/2001 | Asano et al. | |
| 6,271,616 | B1 * | 8/2001 | Akemakou | H02K 1/278 310/152 |
| 6,472,789 | B1 * | 10/2002 | Akemakou | H02K 21/042 310/156.49 |
| 6,847,144 | B1 | 1/2005 | Luo | |
| 7,923,881 | B2 | 4/2011 | Ionel et al. | |
| 8,004,140 | B2 * | 8/2011 | Alexander | H02K 1/2773 310/156.48 |
| 8,089,190 | B2 | 1/2012 | Lee et al. | |
| 8,102,091 | B2 | 1/2012 | Ionel | |
| 8,334,667 | B2 * | 12/2012 | Sakai | H02K 1/2766 148/301 |
| 8,461,737 | B2 * | 6/2013 | Feng | H02K 1/223 310/156.53 |
| 8,803,394 | B2 * | 8/2014 | Sano | H02K 1/2766 310/156.49 |
| 8,896,177 | B2 | 11/2014 | Kim | |
| 2005/0001503 | A1 * | 1/2005 | Hans | H02K 1/2766 310/156.53 |
| 2013/0057103 | A1 * | 3/2013 | Han | H02K 1/2773 310/156.12 |
| 2013/0207498 | A1 * | 8/2013 | Kusase | H02K 1/16 310/156.01 |
| 2014/0021819 | A1 | 1/2014 | Hong et al. | |
| 2014/0023223 | A1 | 1/2014 | Hwang et al. | |
| 2015/0022042 | A1 * | 1/2015 | Han | H02K 1/2773 310/156.23 |
| 2015/0115758 | A1 | 4/2015 | Koka et al. | |
| 2015/0171684 | A1 | 6/2015 | McClelland et al. | |
| 2015/0288233 | A1 | 10/2015 | Kim et al. | |
| 2015/0380996 | A1 * | 12/2015 | Kim | H02K 1/2773 310/156.56 |
| 2018/0069443 | A1 * | 3/2018 | Han | H02K 1/27 |

OTHER PUBLICATIONS

Gieras, J.F., Permanent magnet motors technology: Design and applications, 3rd edition, Taylor & Francis, CRC Press Group, Boca Raton—London—New York, 2010; 59 pages.

European Search Report for Application No. 17188274.9-1202/3291415; dated Feb. 15, 2018; 9 pgs.

* cited by examiner

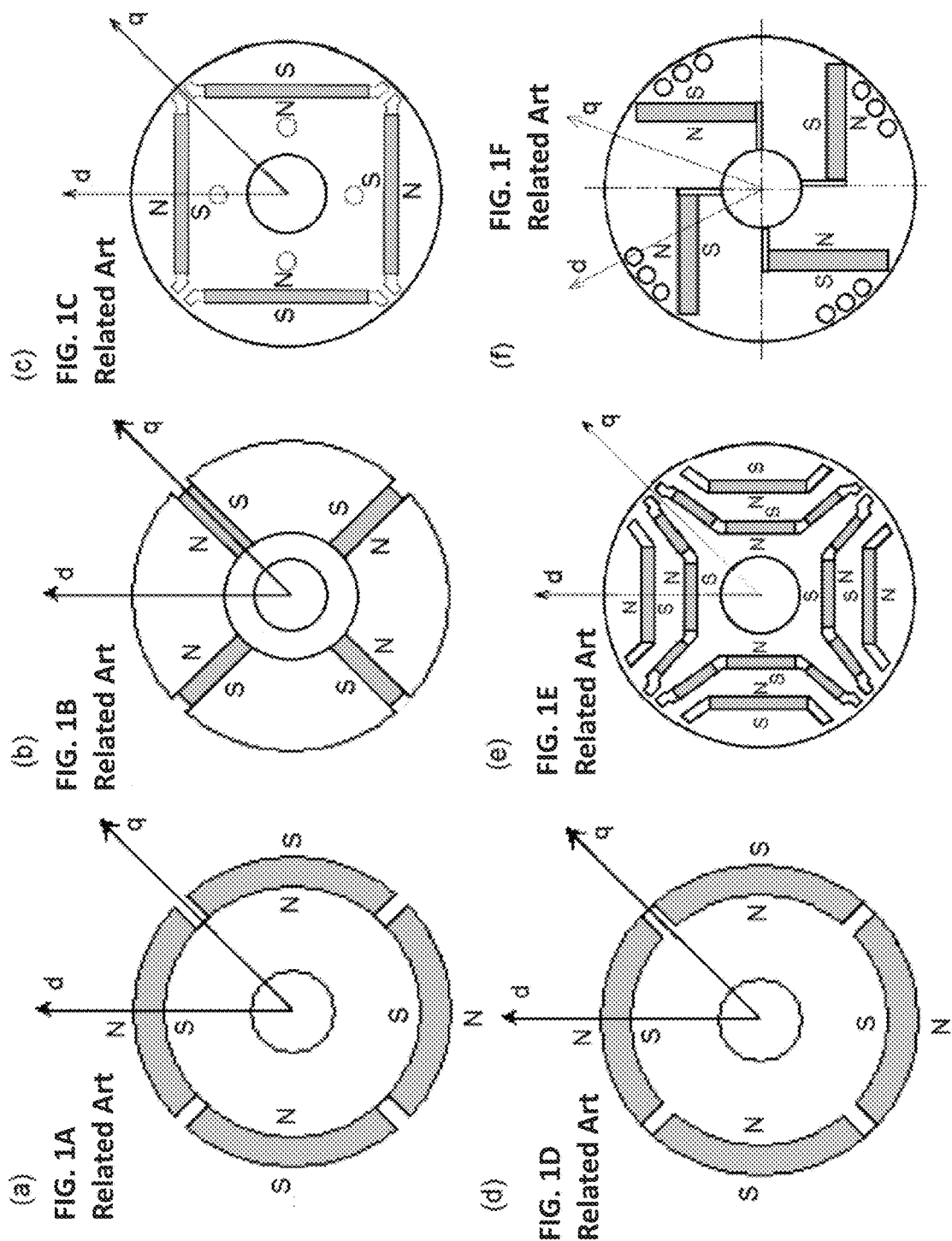

INTERIOR PERMANENT MAGNET MOTOR/ROTOR WITH CURVED AND SPOKE-TYPE PERMANENT MAGNETS

BACKGROUND

The subject matter disclosed herein generally relates to a permanent magnet rotor and, more particularly, to the interior placement of permanent magnets within a permanent magnet rotor.

Permanent magnet (PM) synchronous motors are found in a broad assortment of applications ranging from automotive, aircraft, watercraft, robotics, machinery, and other areas as well. As way of example only, in aerospace electromechanical drives have been used in electric fuel pumps, electric actuation systems for flight control, electric cabin air compressors, nitrogen generation systems, compartment refrigeration units, and supplemental cooling units.

A number of different arrangements of the magnets have been provided within permanent magnet motors. For example, as shown in FIG. 1A through FIG. 1F rotor configuration for PM synchronous motors have included: (a) surface-magnet rotor; (b) spoke-type magnet rotor; (c) interior-magnet rotor with flat PMs; (d) inset-magnet rotor; (e) rotor with double-layer interior magnets; and (f) rotor with buried magnets asymmetrically distributed. d-axis (direct axis) is the center axis of magnetic pole, q-axis (quadrature axis) is the axis electromagnetically orthogonal to the d-axis. However, this list is not exhaustive of all possible arrangements.

Accordingly, there is a constant desire for improvements in the magnet arrangement within these PM motors to provide desired motor properties.

BRIEF DESCRIPTION

According to one embodiment an interior permanent magnet (IPM) rotor is provided. The IPM rotor includes a rotor body that rotates around a central rotational axis, wherein the rotor body is a ferromagnetic core with a central axial bore and is included of a plurality of rotor segments, wherein each rotor segment corresponds to a pole of the IPM motor, and wherein at least one of the rotor segments of the plurality of rotor segments includes a spoke-type interior permanent magnet (IPM) disposed within the rotor body and extending radially outward from the central axial bore to an outer surface of the rotor body, and a curved interior permanent magnet (IPM) disposed within the rotor body and extending radially outward at an incline with respect to a radial plane extending through a center of the spoke-type IPM.

In addition to one or more of the features described above, or as an alternative, further embodiments may include a bridge distance extending from an interior surface of the rotor body from the central axial bore to a surface of the spoke-type IPM that is nearest the central axial bore.

In addition to one or more of the features described above, or as an alternative, further embodiments may include, wherein the bridge distance is selected to obtain full magnetic saturation of the bridge area.

In addition to one or more of the features described above, or as an alternative, further embodiments may include wherein the bridge distance is selected that maintains mechanical structural integrity of the rotor body.

In addition to one or more of the features described above, or as an alternative, further embodiments may include wherein the bridge distance is less than 1 millimeter.

In addition to one or more of the features described above, or as an alternative, further embodiments may include wherein the IPM rotor is a 4-pole IPM rotor.

In addition to one or more of the features described above, or as an alternative, further embodiments may include wherein the IPM rotor is at least one selected from a group consisting of a 2-pole IPM rotor, a 6-pole IPM rotor, 8-pole IPM rotor, a 10-pole IPM rotor, an 12-pole IPM rotor, an 14-pole IPM rotor, and a 16-pole IPM rotor.

In addition to one or more of the features described above, or as an alternative, further embodiments may include wherein the plurality of segments are arranged such that an alternating pattern is provided between the spoke-type magnets and curved IPMs.

In addition to one or more of the features described above, or as an alternative, further embodiments may include wherein the curved IPM is V-shaped.

In addition to one or more of the features described above, or as an alternative, further embodiments may include wherein the curved IPM is one selected from a group consisting of a C-shaped IPM, a U-shaped IPM, and a half-ring shaped IPM.

In addition to one or more of the features described above, or as an alternative, further embodiments may include multiple curved-shaped IPMs disposed in layers extending radially outward within the rotor body.

In addition to one or more of the features described above, or as an alternative, further embodiments may include a stator attached to an outer surface of the rotor.

In addition to one or more of the features described above, or as an alternative, further embodiments may include wherein the spoke-type IPM and the curved IPM are selected from one or more of a SmCo permanent magnet and an NdFeB permanent magnet.

In addition to one or more of the features described above, or as an alternative, further embodiments may include wherein the spoke-type IPM and the curved IPM are ferrite magnets.

According to an embodiment a permanent magnet synchronous motor system is provided. The system includes an interior permanent magnet (IPM) rotor including a rotor body that rotates around a central rotational axis, wherein the rotor is a ferromagnetic core with a central axial bore and is included of a plurality of rotor segments, wherein each segment corresponds to a pole of the IPM motor, wherein at least one of the rotor segments of the plurality of rotor segments includes a spoke-type interior permanent magnet (IPM) disposed within the rotor body and extending radially outward from the central axial bore to an outer surface of the rotor body, and a curved interior permanent magnet (IPM) disposed within the rotor body and extending radially outward at an incline with respect to a radial plane extending through a center of the spoke-type IPM, and a stator attached to an outer surface of the interior permanent magnet (IPM) rotor.

In addition to one or more of the features described above, or as an alternative, further embodiments may include wherein the PM synchronous motor system is a PM synchronous brushless motor system.

In addition to one or more of the features described above, or as an alternative, further embodiments may include a bridge distance extending from an interior surface of the rotor body from the central axial bore to a surface of the spoke-type IPM that is nearest the central axial bore.

In addition to one or more of the features described above, or as an alternative, further embodiments may include wherein the plurality of segments are arranged such that an alternating pattern is provided between the spoke-type magnets and curved IPMs.

In addition to one or more of the features described above, or as an alternative, further embodiments may include multiple curved-shaped IPMs disposed in layers extending radially outward within the rotor body.

In addition to one or more of the features described above, or as an alternative, further embodiments may include wherein the bridge distance is selected to obtain full magnetic saturation of the bridge area, and wherein the bridge distance is selected that maintains mechanical structural integrity of the rotor body.

According to an embodiment a method of providing an interior permanent magnet (IPM) rotor is provided. The method includes providing a rotor body that rotates around a central rotational axis that is a ferromagnetic core with a central axial bore and is included of a plurality of rotor segments that each correspond to a pole of the IPM motor, providing, in at least one of the plurality of rotor segments, a spoke-type interior permanent magnet (IPM) within the rotor body and extending radially outward from the central axial bore to an outer surface of the rotor body, and providing, in the at least one of the plurality of rotor segments, a curved interior permanent magnet (IPM) within the rotor body and extending radially outward at an incline with respect to a radial plane extending through a center of the spoke-type IPM.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which:

FIGS. 1A, 1B, 1C, 1D, 1E, and 1F are a cross sectional views of permanent magnet motor arrangements;

DETAILED DESCRIPTION

Figure 2A:
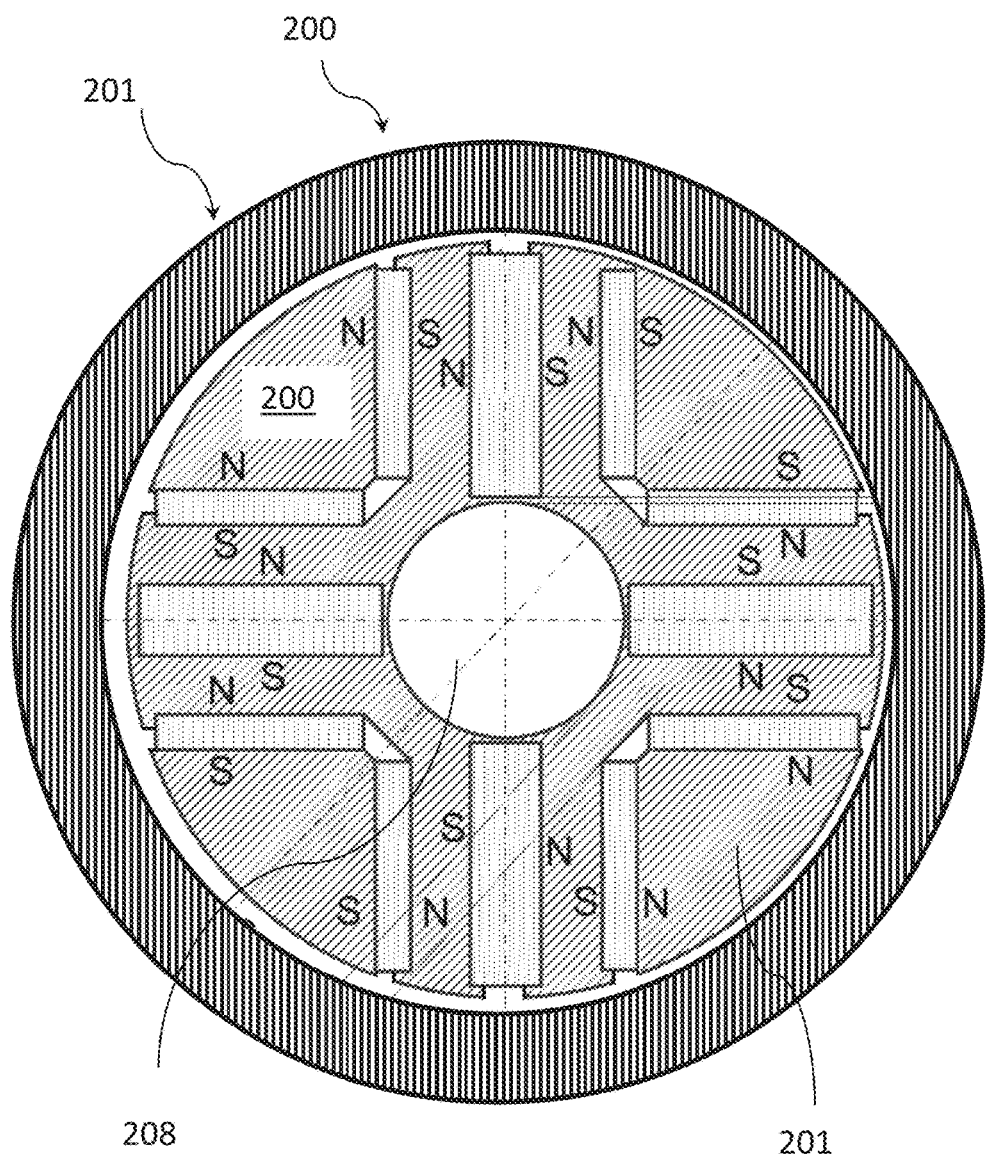
FIG. 2A is a cross sectional view of a four pole interior permanent magnet (IPM) motor in accordance with one or more embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to an interior permanent magnet (IPM) rotor that includes a rotor body that rotates around a central rotational axis. The rotor body is a ferromagnetic core with a central axial bore and is comprised of a plurality of rotor segments.

Further, each segment corresponds to a pole of the IPM motor. At least one of the rotor segments of the plurality of rotor segments includes a spoke-type interior permanent magnet (IPM) disposed within the rotor body and extending radially outward from the central axial bore to an outer surface of the rotor body. Also, the at least one rotor segment also includes a curved interior permanent magnet (IPM) disposed within the rotor body and extending radially outward at an incline with respect to a radial plane extending through a center of the spoke-type IPM.

Figure 2B:
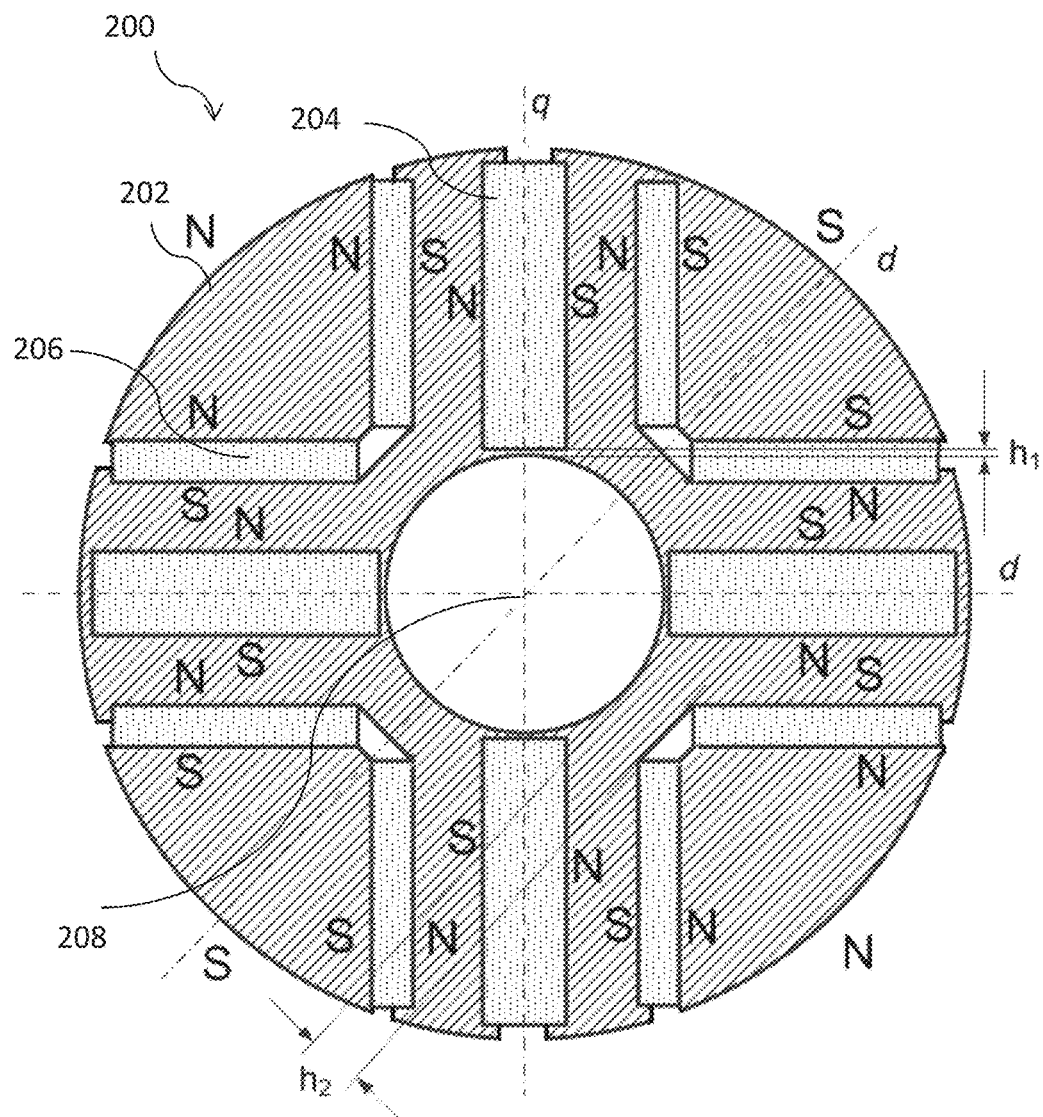
FIG. 2B is a cross sectional view of a four pole interior permanent magnet (IPM) rotor in accordance with one or more embodiments of the present disclosure.

According to one or more embodiments, a PM synchronous brushless motor (PM motor) includes a four pole IPM rotor as shown in FIGS. 2A & 2B. This motor has a higher magnetic flux density in the air gap than other PM rotors shown in FIG. 1. By providing a higher magnetic flux density in the air gap this IPM motor can provide a higher torque and better dynamic performance. Further, the IPM rotor is easy to manufacture, because it does not need any non-ferromagnetic retaining sleeve.

Additionally, in accordance with one or more embodiments, the PM motor is provided with a high degree of reliable, because the PMs are naturally protected against mechanical centrifugal stresses by being located within the rotor body. Additionally, the reliability of the PM motor is improved compared to other designs because the PMs are electromagnetically protected against demagnetization at reversals or abnormal operation because the armature reaction magnetic flux penetrating from the stator to the rotor goes through laminated ferromagnetic core (low reluctance), thus omitting PMs. Also, the IPM motor allows for application of cost-effective ferrite magnets instead of expensive SmCo or NdFeB PMs. Though either can be used in accordance with embodiments disclosed herein.

For example, turning now to FIGS. 2A & 2B, a cross sectional view of a four pole interior permanent magnet (IPM) rotor 200 is shown in accordance with one or more embodiments. This IPM rotor 200 is part of an IPM motor 100 which can include stators 201 connected to the outer surface of the IPM rotor 200. The IPM rotor 200 includes a rotor body 202. The rotor body 202 is a ferromagnetic core with a central axial bore 208 and is comprised of a plurality of rotor segments. The IPM rotor further includes at least one spoke-type IPM 204 that is placed within the rotor body and extends radially outward from the central axial bore to an outer surface of the rotor body 202. The rotor body 202 also includes at least one curved IPM 206. The curved IPM is located within the rotor body and extends radially outward at an incline with respect to radial plane extending through a center of the spoke-type IPM.

The magnetic poles of each of the IPM magnets are designated with "N" and "S" to show the north and south poles of each magnet in the arrangement.

Further, the IPM rotor includes bridge distance $h_1$ extending from an interior surface of the rotor body 202 from the central axial bore 208 to a surface of the spoke-type IPM 204 that is nearest the central axial bore 208. This distance $h_1$ is selected to obtain full magnetic saturation of the bridge area. Further, according to another embodiment, the distance $h_1$ is selected that maintains mechanical structural integrity of the rotor body. According to one embodiment the distance h1 is less than 1 millimeter but is not limited thereto.

According to one embodiment, for example, the selection of thickness of bridge $h_1$ between vertical PMs and shaft does not exceed $h_1 \leq 1.0$ mm, in order to obtain high saturation of the ferromagnetic bridge. Otherwise, the leakage flux between neighboring vertical PMs is high. The thickness of the bridge $h_2$ between V-shaped PMs and shaft can be greater, but usually, dependent on the size of the rotor and dimensions of PMs. For example, in one embodiment the bridge is less than $h_2 \leq 10$ mm. In one embodiment, if the bridge $h_1$ must be very thin from electromagnetic point of view, the rotor can be protected against mechanical stresses with the aid of two non-ferromagnetic disks at each end of the stack and axial bolts.

Further, according to another embodiment, a second bridge distance $h_2$ can also be provided that extends from the inner surface of the rotor body 202 from the central axial bore 208 to a surface of the curved IPM 206 that is nearest the central axial bore 208 as shown.

Figure 3:
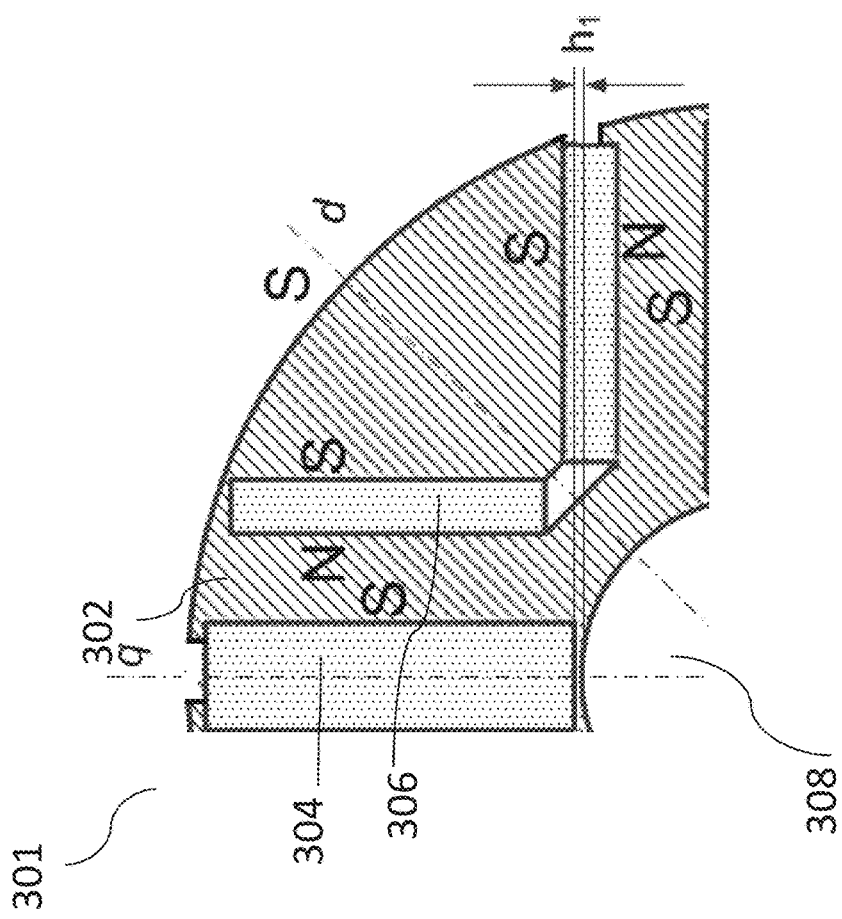
FIG. 3 is a cross sectional view of one segment of an interior permanent magnet (IPM) rotor in accordance with one or more embodiments of the present disclosure.

FIG. 3 is a cross sectional view of one segment 301 of an interior permanent magnet (IPM) rotor in accordance with one or more embodiments of the present disclosure. The segment 301 includes a portion of the rotor body 302 that includes one set of magnets. Specifically, the segment 301 of the rotor body 302 includes a spoke-type IPM 304 and a curved IPM 306. As shown the central axial bore 308 makes up the inner most portion of the segment 301. As shown, this particular segment 301 would make up one fourth an entire IPM rotor in the case of a four pole machine. However, according to other embodiments, the segment can be compressed such that 6 or as many as 10 or more segments are provided that make up the IPM rotor, dependent on the number of poles. A version of such compression in shown in FIG. 4.

Figure 4:
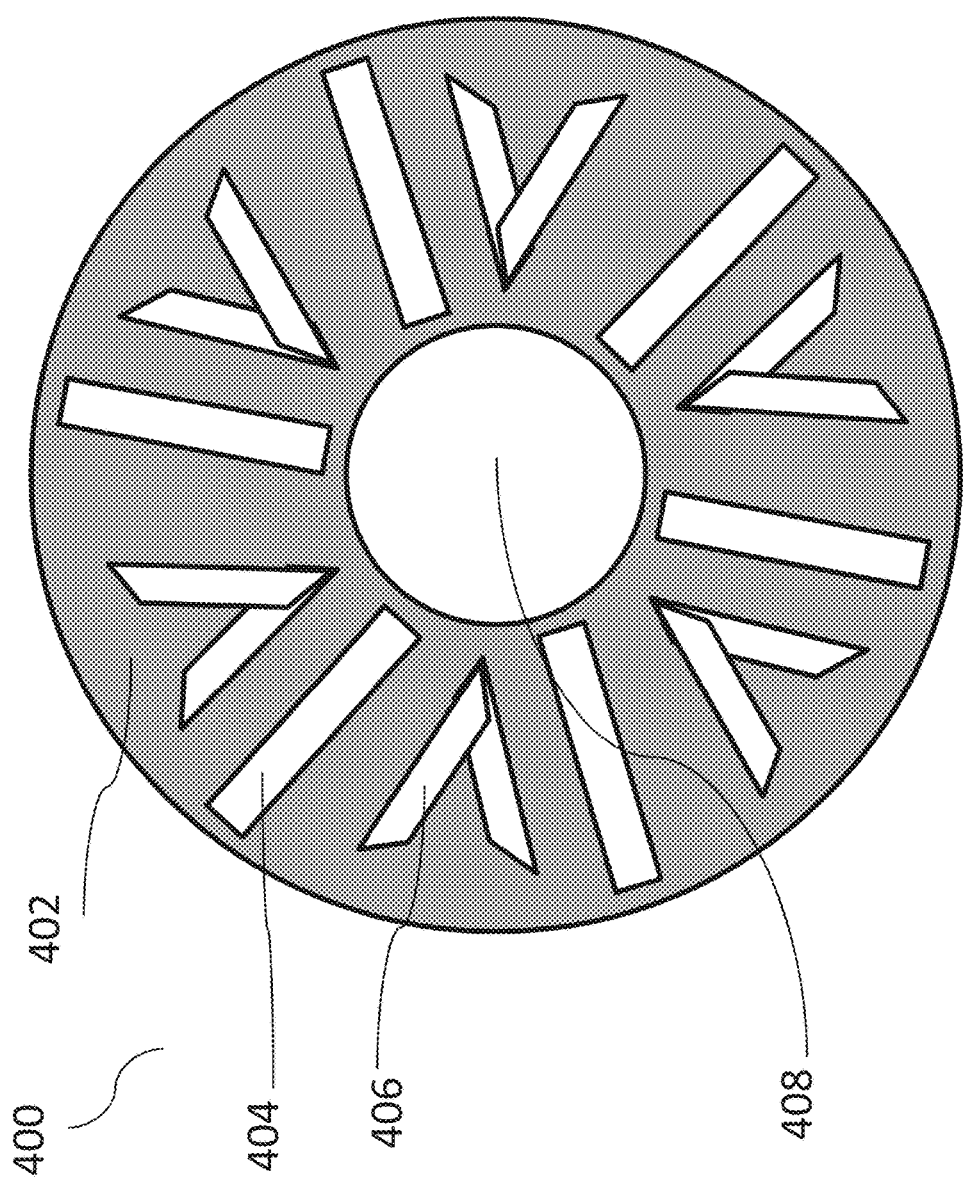
FIG. 4 is a cross sectional view of another interior permanent magnet (IPM) rotor in accordance with one or more embodiments of the present disclosure.

For example, FIG. 4 is a cross-sectional view of another interior permanent magnet (IPM) rotor 400 in accordance with one or more embodiments of the present disclosure. The IPM rotor 400 includes a plurality of spoke-type IPMs 404 and a plurality of V-shaped IPMs 406. These elements are arranged in an alternating pattern around the central axial bore 208 as shown. As shown, this IPM rotor 400 has six segments that correspond to a six pole motor. According to other embodiments, more or less poles can be provided.

Figure 5:
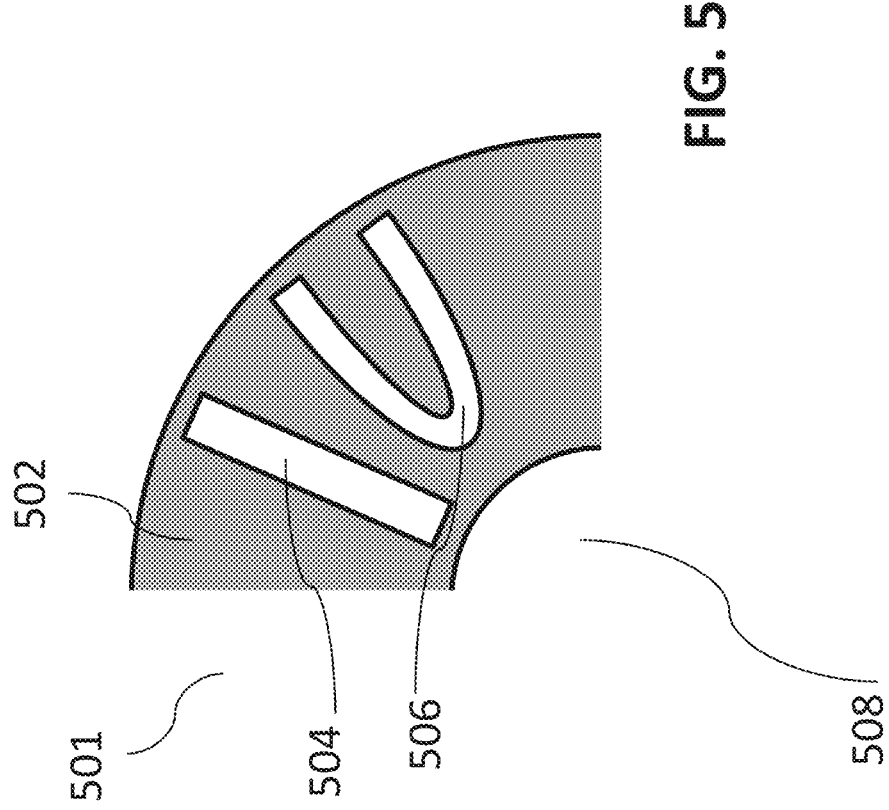
FIG. 5 is a cross sectional view of one segment of an interior permanent magnet (IPM) rotor in accordance with one or more embodiments of the present disclosure.

According to another embodiment, FIG. 5 is a cross sectional view of one segment 501 of an interior permanent magnet (IPM) rotor in accordance with one or more exemplary embodiments of the present disclosure. The segment 501 includes a part of the rotor body 502 and a pair of magnets. Specifically the segment 501 includes a spoke-type magnet 504 and a U-shaped magnet 506 that are arranged extending radially outward from the central axial bore 508.

Figure 6:
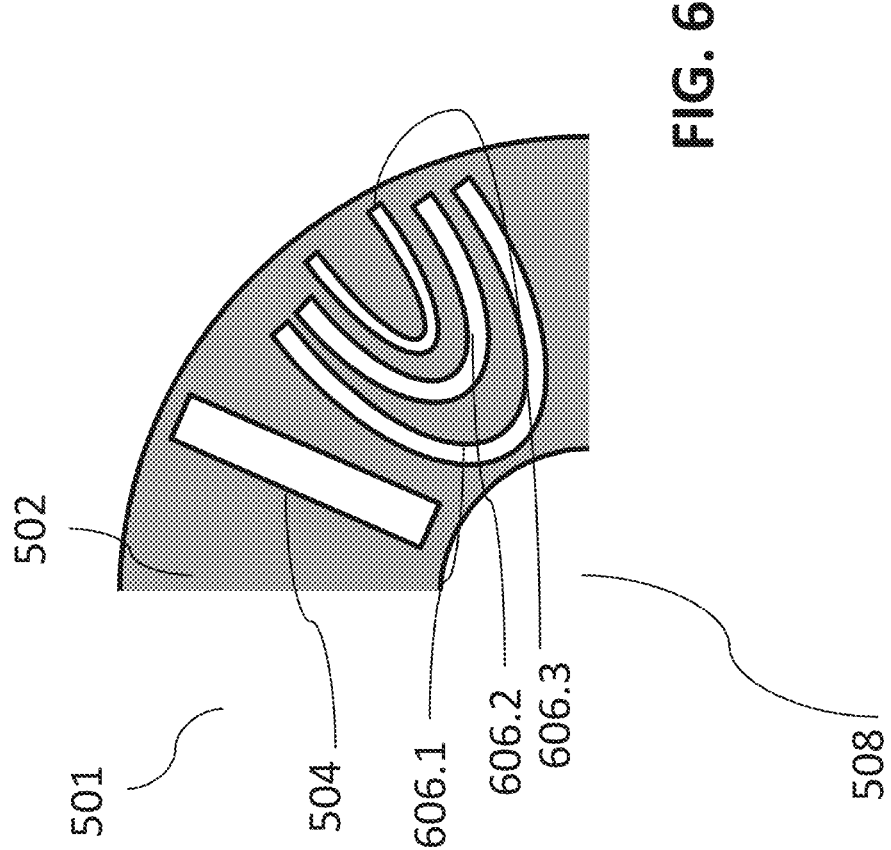
FIG. 6 is a cross sectional view of one segment of an interior permanent magnet (IPM) rotor in accordance with one or more embodiments of the present disclosure.

According to other embodiments, FIG. 6 is a cross sectional view of one segment 501 of an interior permanent magnet (IPM) rotor in accordance with one or more embodiments of the present disclosure. This segment 501 includes a part of rotor body 502 that includes a number of magnets. Specifically, a spoke-type IPM 504 is provided that extends radially outward from the central axial bore 508. Also provided are a first curved magnet 606.1, a second curved magnet 606.2, and a third magnet 606.3 that are provided in layers extending outward from the central axial bore 508.

Figure 7:
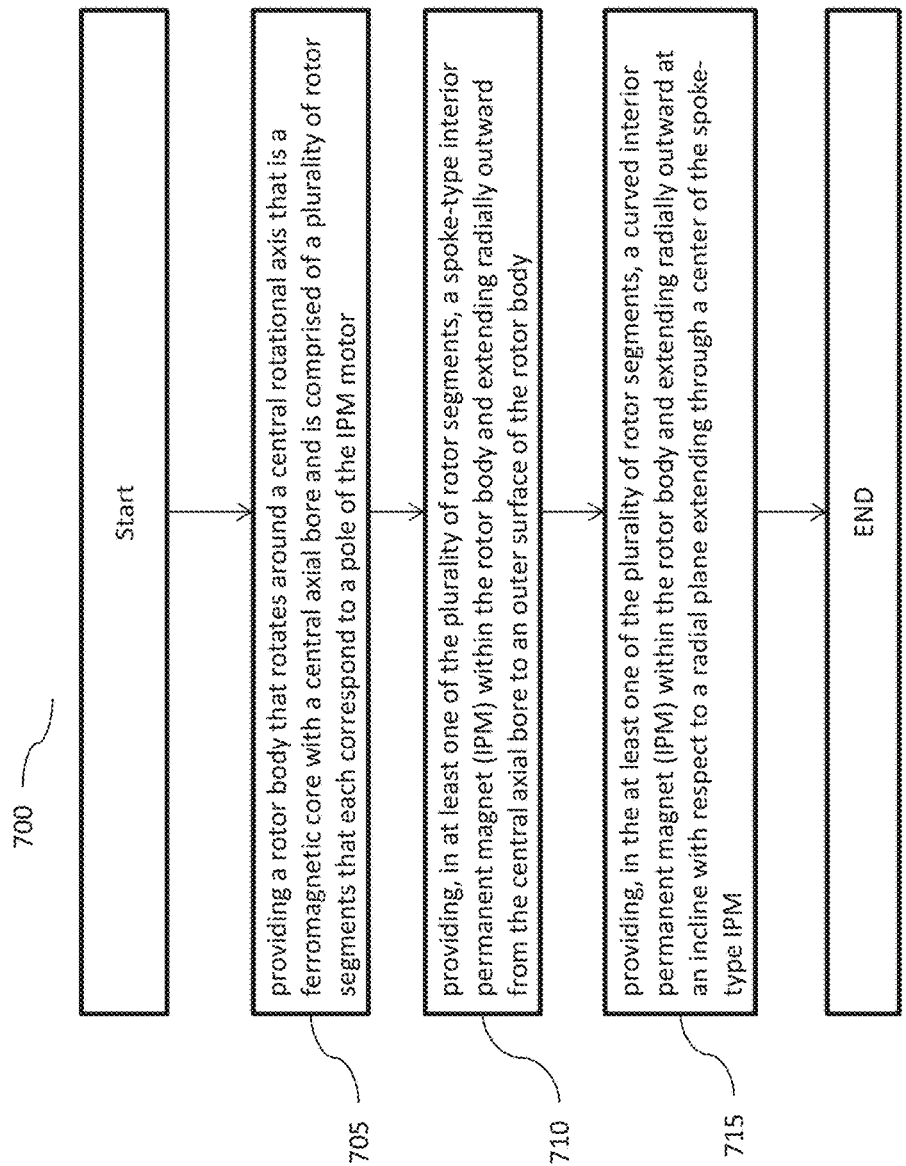
FIG. 7 is a flowchart of a method of providing an interior permanent magnet (IPM) rotor in accordance with one or more embodiments of the present disclosure.

FIG. 7 is a flowchart of a method of providing an interior permanent magnet (IPM) rotor in accordance with one or more embodiments of the present disclosure. The method 700 includes providing a rotor body that rotates around a central rotational axis that is a ferromagnetic core with a central axial bore and is comprised of a plurality of rotor segments that each correspond to a pole of the IPM motor (operation 705). The method 700 also includes providing, in at least one of the plurality of rotor segments, a spoke-type interior permanent magnet (IPM) within the rotor body and extending radially outward from the central axial bore to an outer surface of the rotor body (operation 710). Further, the method 700 includes providing, in the at least one of the plurality of rotor segments, a curved interior permanent magnet (IPM) within the rotor body and extending radially outward at an incline with respect to a radial plane extending through a center of the spoke-type IPM.

Advantageously, embodiments described herein provide a result of synergistic integration. For example the performance, manufacturing process and reliability is improved. The weight and volume of the motor can be also reduced.

Additionally, the IPM rotor shows the following advantages: (a) High magnetic flux density in the air gap as a result of integration of spoke-type PMs with V-shaped PMs; (b) High magnetic flux density in the air gap which provides high torque and dynamic performance of IPM synchronous motor; (c) High magnetic flux density in the air gap also allows for reduction of the volume envelope and weight of the machine; (d) Easy manufacture, because the IPM rotor does not need any non-ferromagnetic retaining sleeve; (e) High reliability; and (f) Cost-effective manufacturing because, if necessary, SmCo or NdFeB PMs can be replaced with cheaper ferrite magnets.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. An interior permanent magnet (IPM) rotor comprising:
a rotor body that rotates around a central rotational axis, wherein the rotor body is a ferromagnetic core with a central axial bore and is comprised of a plurality of rotor segments,
wherein each rotor segment corresponds to a pole of the IPM motor, and
wherein at least one of the rotor segments of the plurality of rotor segments comprises:
a spoke-type interior permanent magnet (IPM) disposed within the rotor body and extending radially outward from the central axial bore to an outer surface of the rotor body; and
a curved interior permanent magnet (IPM) disposed within the rotor body and extending radially outward at an incline with respect to a radial plane extending through a center of the spoke-type IPM,
wherein the ferromagnetic core has a bridge distance extending from an interior surface of the rotor body from the central axial bore to a surface of the spoke-type IPM that is nearest the central axial bore, the bridge distance configured to control leakage flux between the spoke-type (IPM) and the central axis bore, wherein the bridge distance is less than 1 millimeter.

2. The IPM rotor of claim 1,
wherein the bridge distance is selected to obtain full magnetic saturation of the bridge area.

3. The IPM rotor of claim 1,
wherein the bridge distance is selected that maintains mechanical structural integrity of the rotor body.

4. The IPM rotor of claim 1,
wherein the IPM rotor is at least one selected from a group consisting: of a 2-pole IPM rotor, a 4-pole IPM rotor, a 6-pole IPM rotor, 8-pole IPM rotor, a 10-pole IPM rotor, an 12-pole IPM rotor, an 14-pole IPM rotor, and a 16-pole IPM rotor.

5. The IPM rotor of claim 1,
wherein the plurality of segments are arranged such that an alternating pattern is provided between the spoke-type magnets and curved IPMs.

6. The IPM rotor of claim 1,
wherein the curved IPM is V-shaped.

7. The IPM rotor of claim 1,
wherein the curved IPM is one selected from a group consisting of a C-shaped IPM, a U-shaped IPM, and a half-ring shaped IPM.

8. The IPM rotor of claim 1, further comprising:
multiple curved-shaped IPMs disposed in layers extending radially outward within the rotor body.

9. The IPM rotor of claim 1,
wherein the spoke-type IPM and the curved IPM are selected from one or more of a SmCo permanent magnet and an NdFeB permanent magnet.

10. The IPM rotor of claim 1,
wherein the spoke-type IPM and the curved IPM are ferrite magnets.

11. A permanent magnet synchronous motor system comprising:
an interior permanent magnet (IPM) rotor comprising:
a rotor body that rotates around a central rotational axis, wherein the rotor is a ferromagnetic core with a central axial bore and is comprised of a plurality of rotor segments, wherein each segment corresponds to a pole of the IPM motor,
wherein at least one of the rotor segments of the plurality of rotor segments comprises:
a spoke-type interior permanent magnet (IPM) disposed within the rotor body and extending radially outward from the central axial bore to an outer surface of the rotor body; and
a curved interior permanent magnet (IPM) disposed within the rotor body and extending radially outward at an incline with respect to a radial plane extending through a center of the spoke-type IPM; and, wherein a bridge distance exists extending from an interior surface of the rotor body from the central axial bore to a surface of the spoke-type IPM that is nearest the central axial bore, the bridge distance configured to control leakage flux between the spoke-type IPM and the central axis bore, wherein the bridge distance is less than 1 millimeter.

12. The permanent magnet synchronous motor system of claim 11, wherein the PM synchronous motor system is a PM synchronous brushless motor system.

13. The permanent magnet synchronous motor system of claim 11,
wherein the plurality of segments are arranged such that an alternating pattern is provided between the spoke-type magnets and curved IPMs.

14. The permanent magnet synchronous motor system of claim 11, further comprising:
multiple curved-shaped IPMs disposed in layers extending radially outward within the rotor body.

15. The permanent magnet synchronous motor system of claim 11,
wherein the bridge distance is selected to obtain full magnetic saturation of the bridge area, and
wherein the bridge distance is selected that maintains mechanical structural integrity of the rotor body.

16. A method of providing an interior permanent magnet (IPM) rotor, the method comprising:
providing a rotor body that rotates around a central rotational axis that is a ferromagnetic core with a central axial bore and is comprised of a plurality of rotor segments that each correspond to a pole of the IPM motor,
providing, in at least one of the plurality of rotor segments, a spoke-type interior permanent magnet (IPM) within the rotor body and extending radially outward from the central axial bore to an outer surface of the rotor body; and
providing, in the at least one of the plurality of rotor segments, a curved interior permanent magnet (IPM) within the rotor body and extending radially outward at an incline with respect to a radial plane extending through a center of the spoke-type IPM;
wherein a bridge distance exists extending from an interior surface of the rotor body from the central axial bore to a surface of the spoke-type IPM that is nearest the central axial bore, the bridge distance configured to control leakage flux between the spoke-type IPM and the central axis bore, wherein the bridge distance is less than 1 millimeter.

* * * * *